June 21, 1960     D. K. JOVANOVICH     2,941,603
HELICOPTER ROTOR BLADE
Filed May 1, 1956     2 Sheets-Sheet 1
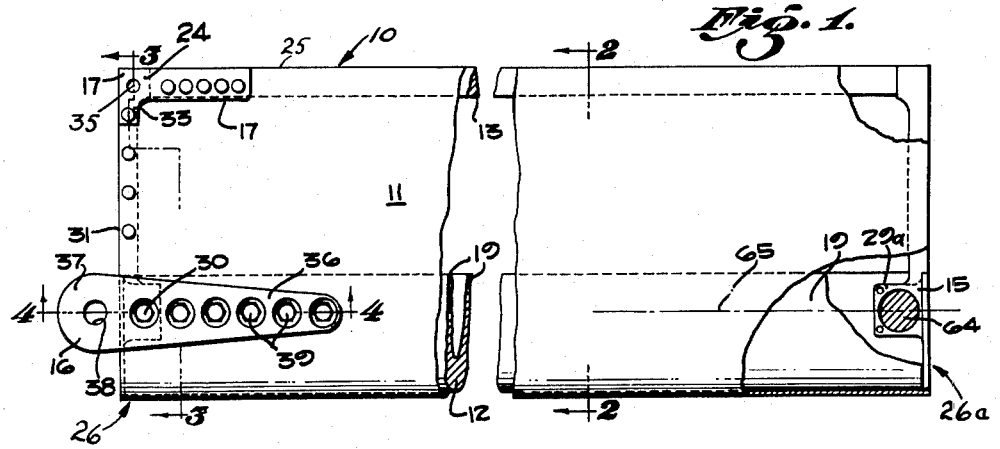
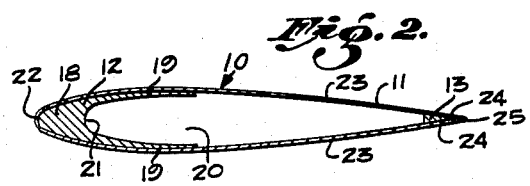
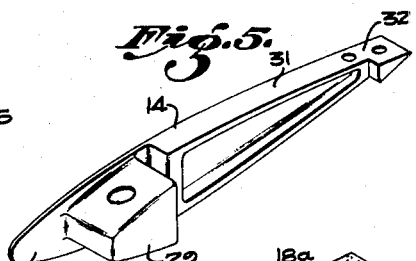
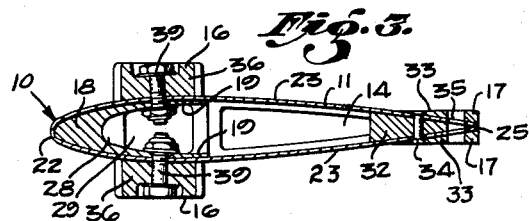
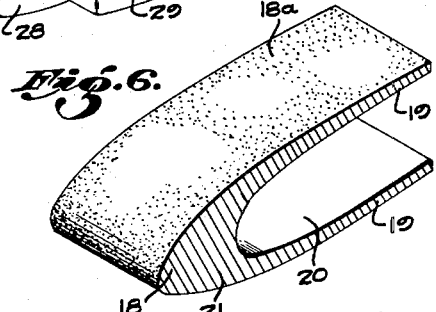
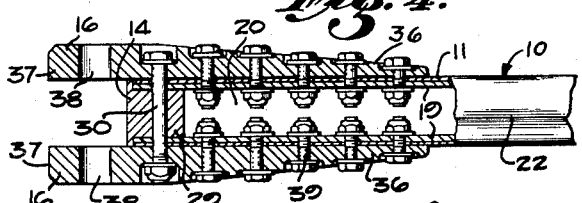
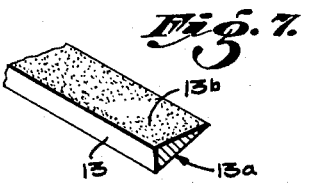
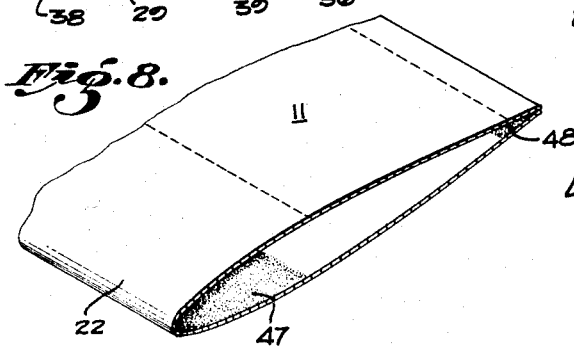
DRAGOLJUB K. JOVANOVICH,
INVENTOR.
BY
ATTORNEY June 21, 1960 D. K. JOVANOVICH 2,941,603
HELICOPTER ROTOR BLADE
Filed May 1, 1956 2 Sheets-Sheet 2
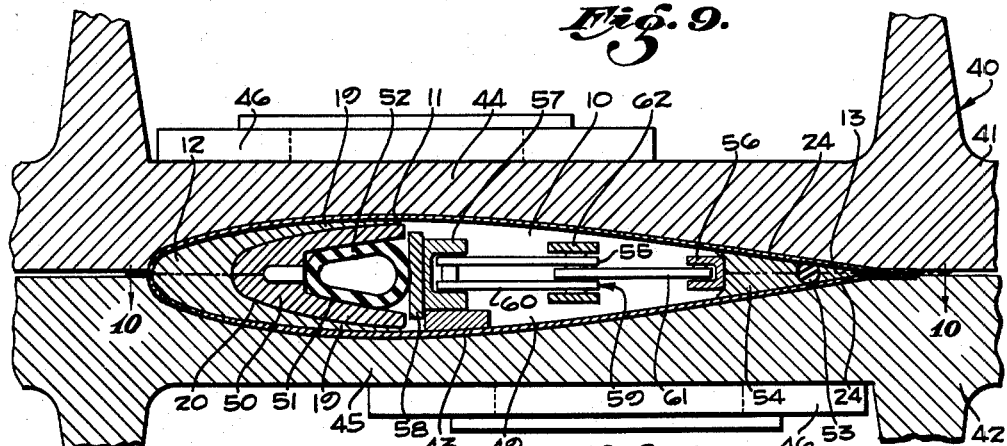
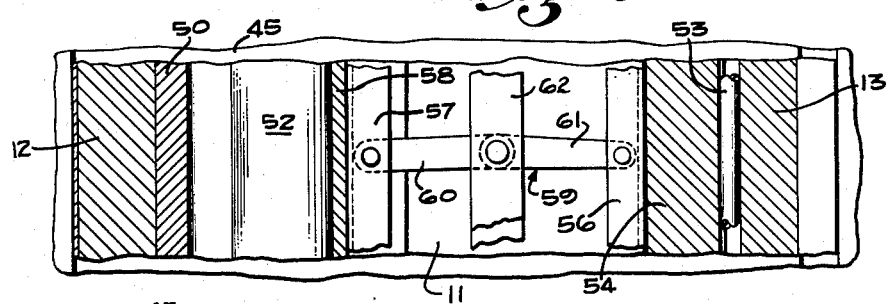
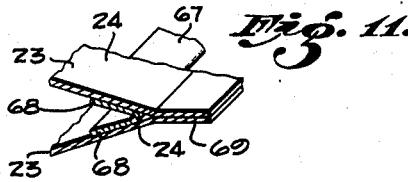
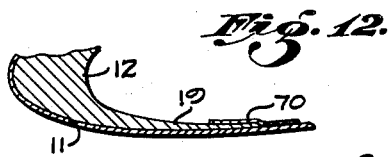
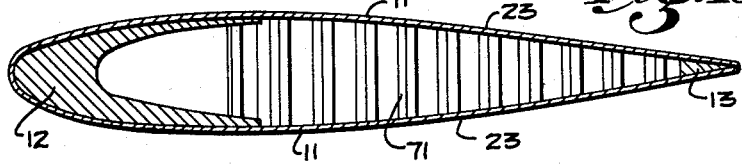
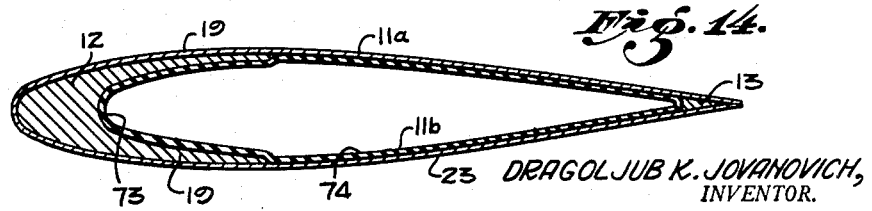
DRAGOLJUB K. JOVANOVICH,
INVENTOR.
BY
ATTORNEY

United States Patent Office 2,941,603
Patented June 21, 1960

2,941,603

HELICOPTER ROTOR BLADE

Drago K. Jovanovich, 357 24th St., Santa Monica, Calif.

Filed May 1, 1956, Ser. No. 581,944

4 Claims. (Cl. 170—159)

My invention relates to the art of making blades such as employed in helicopter rotors, and has for its general objective the provision of a blade and a method of manufacturing the same, which blade, considering its adaptability to the purpose for which it is intended and its structural strength and durability, is light in weight and is economical to manufacture.

This is a continuation-in-part application of my pending application, Serial No. 227,380, filed May 21, 1951, for Helicopter Rotor Blade and Method of Making Same, now abandoned.

It is well known that a helicopter is supported in the air by forces of upward thrust produced as a result of downward velocity continuously imparted to large masses of air by the blades of the revolving helicopter rotor. In constructing these rotor blades, it is common practice to dimension each blade such that the cord width is in the range of five to ten times the greatest thickness and the span length between the limits of fifteen to twenty times the width, and to contour the width and thickness of the blade according to proven airfoil designs wherein seventy to ninety percent (depending upon the attack angle of a revolving blade) of the upward thrust forces are concentrated in the forward thirty percent of the blade, and to position the center of gravity on the cordwise dimension in close proximity to the cordwise center of the upward thrust forces which are commonly referred to as airfoil pressures.

In view of the physical shape of a rotor blade, the forces controlling the attack angle and the forces of airfoil pressure act to twist the blade about its longitudinal axis and to bend the blade in both cordwise and spanwise directions, of which the spanwise bending is counteracted to an appreciable degree by centrifugal force as the blade revolves. Hence, it is generally acknowledged that a rotor blade should be provided with ample stiffness in all directions to prevent the bending and twisting action of the airfoil pressures and control forces from causing blade deflections which would affect the airfoil contour and lower the thrust-producing efficiency thereof and/or produce excessive stresses in any element of the blade structure.

To prevent airfoil distortion and, at the same time, preclude undesirable deflections in twist and bending, prior art blades are extremely complicated structures having many component parts which are difficult and costly to make and assemble. Moreover, under constant flapping deflections, high stresses in the outer metal skins of the complicated prior art blade assemblies are such as to cause blade failure if a slight scratch, flaw, or other imperfection exists in the skin surface; hence, to avert accidents caused by blade failure, close mechanical inspection of prior art blades at frequent intervals is an expensive but necessary procedure in the use of helicopters equipped therewith.

As previously indicated, it is common knowledge that an airfoil section chosen for its ability to produce optimum upward thrust, is sensitive to deviations in its contour; however, it is also well known that, starting from the leading edge, this sensitivity to contour deviations decreases from a maximum in the region of the airfoil leading edge through a range of decrescent values to a zero quantity at the trailing edge, and that the pattern of sensitivity follows closely the pattern of airfoil pressures effecting the upward thrust. Thus, it is well established that maximum sensitivity to contour deviation is concentrated in the immediate region of the leading edge, and that this sensitivity decreases rapidly to a nominal value toward the rear portion of the forward thirty percent of the blade, from where it continues to diminish to zero at the trailing edge; hence, in those portions of the blade having low sensitivity to contour deviation, slight changes in airfoil contour by the thrust producing forces are permissible because such changes have little effect on the aerodynamic efficiency of the blade in producing airfoil pressures.

To meet the stiffness requirements for effectively resisting the forces of twist and bending and, at the same time provide sufficient rigidity for preventing contour deviations in the sensitive forward portions of the airfoil section, the present invention contemplates a simple, inexpensive blade structure of uniform profile, which comprises a nose spar capable of maintaining the cross sectional configuration of the contour-sensitive forward portion of the blade throughout its length, and an airfoil-shaped skin cementitiously bonded to the outer surface of the nose spar such that rearwardly extending upper and lower portions terminate in a trailing-edge junction so as to constitute the balance of the blade. In the blade structure contemplated by this invention, the nose spar is an extruded structural element having a U-shaped cross section, arranged such that the base of the U-shaped element is disposed in the forward portion of the blade with the legs of the element extending rearwardly and slightly beyond the aerodynamic center to thereby provide the blade with graduated rigidity from a maximum in the region of the leading edge to an acceptable minimum at the distal ends of the legs, which rigidity is sufficient to maintain the airfoil contour of the blade within acceptable limits of aerodynamic efficiency and, at the same time, provide the blade with adequate strength to prevent undesirable spanwise bending. It is further contemplated that the trailing-edge junction of the upper and lower portions of the airfoil-shaped skin, include a trailing-edge filler strip having a triangular cross section such as to define the decrescent trailing edge thickness and effect a cementitiously bonded relationship of the upper and lower skin portions at the trailing edge of the blade. Important features of the contemplated structure reside in the fact that the nose spar is made from a single piece of the same material such as to constitute a homogeneous member having a U-shaped cross section proportioned so that the base or web of the section is sufficiently massive to provide essential weight to the forward portion of the blade, and so that the web portion blends smoothly into the legs such that each leg decreases gradually to a predetermined minimum thickness at its distal end to provide the nose spar with the graduated rigidity previously mentioned. Moreover, the nose spar is not only protectively covered by the airfoil skin but, because of the cementitiously bonded relationship therebetween, cracks or fissures developed in the skin by blade flexure from scratches or flaws in the skin surface stop at the bond line and do not propagate into the nose spar.

It is an object of the invention to provide a hollow rotor blade which can be readily fabricated from relatively lightweight metals to provide ample stiffness for aerodynamic requirements.

It is an object of the invention to provide a rotor blade fabricated from parts secured together so that flaws or cracks developing in one of the parts as the result of severe loads or fatigue will not be transmitted to the other or connecting parts.

It is an object of the invention to provide a rotor blade with an airfoil-shaped skin comprising a generally rectangular sheet of lightweight metal, or other suitable sheet material, bent along its middle such as to effect the nose portion or leading edge contour for the airfoil skin, and such that the longitudinal edges are brought together to form a trailing edge for the skin; this skin member of the blade being reenforced by and cooperating with a nose spar and a trailing edge strip which are installed and secured within the skin member.

It is an object of the invention to provide a blade of the character set forth in the preceding paragraph in which the nose spar and trailing edge strip are homogeneous members, i.e., each member is made of one piece of material, of uniform cross section cementitiously bonded, respectively, to the inner surface of the contoured nose or leading edge portion of the airfoil-shaped skin and to the inner surface of said skin at the trailing edge thereof, such that the bonded relationships between these members and the skin effectively provide adequate blade rigidity to prevent deflections of the blade from exceeding acceptable limits.

It is a further object of the invention to provide such a blade in which the homogeneous nose spar is an extruded member having a U-shaped or deep channel-shaped cross section generally symmetrical about a center line corresponding to the cord line of the blade, and proportioned such that a large mass of the material comprising the spar is concentrated in the base or web of the section, and such that the legs or flanges gradually decrease from a maximum thickness at their junctions with the base or web to a minimum thickness at their distal edges; whereby the blade is provided with essential weight near the leading edge thereof and with cordwise rigidity that gradually decreases from a maximum value in the region of the base or web of the nose spar to a minimum value in the region of the distal edges of the spar flanges, which weight and rigidity are of a character such as to effect coincidence of the cordwise gravity center with the blade pitch axis and maintain the airfoil contour of the contour-sensitive forward-portion of the blade, respectively.

It is a further object of the invention to provide a rotor blade of a truly hollow construction which can be economically manufactured with a minimum of lightweight metal parts, this blade having filler members to close the ends thereof, having simple means for connecting the blade to the central rotating means from which the blades extend, and having a simple means for weighting the outer end of the blade.

Further objects and advantages of the invention will be brought out in the following part of the specification wherein the detailed description is for the purpose of disclosing preferred embodiments of the invention without limiting the scope of the invention set forth in the appended claims nor limiting the range of equivalents to which the claims may be entitled.

Referring to the drawings which are for illustrative purposes only:

Fig. 1 is a plan view of a preferred embodiment of my rotor blade, this view being condensed in a spanwise direction so as to show both extremities of the blade;

Fig. 2 is a section taken as indicated by line 2—2 of Fig. 1;

Fig. 3 is a sectional view taken as indicated by the line 3—3 of Fig. 1;

Fig. 4 is a cross-section taken on the plane indicated by the line 4—4 of Fig. 1;

Fig. 5 is a perspective view of one of the filler pieces employed to close the ends of the rotor blade;

Fig. 6 is a perspective view of a portion of the nose spar of the blade shown in Fig. 1;

Fig. 7 is a perspective view of a portion of the trailing edge strip employed in the rotor blade;

Fig. 8 is a perspective view of a portion of the airfoil-shaped skin of the rotor blade;

Fig. 9 is a fragmentary sectional view showing the component parts of a rotor blade within a jig during the performance of the method of manufacture forming a part of this invention;

Fig. 10 is a sectional view taken on the horizontal plane indicated by the line 10—10 of Fig. 9;

Fig. 11 is a fragmentary sectional view showing an alternative structure comprising the trailing edge of the blade;

Fig. 12 is a fragmentary sectional view showing a manner of reenforcing the bonded relationship between the distal edges of the nose spar flanges and the skin member;

Fig. 13 is a cross-sectional view of a rotor blade embodying the invention, showing the addition of honeycomb reinforcement to the hollow of the blade for increasing blade stiffness if desired; and Fig. 14 is a cross-sectional view of a rotor blade embodying the invention having a liner of sheet material bonded to the inner wall of the hollow blade.

The rotor blade 10 of suitable airfoil section, shown in Fig. 1, comprises an airfoil skin 11 which forms the outer surface of the blade 10, a nose spar 12 and a trailing edge strip 13, filler pieces 14 and 15 closing the ends of the blade, and attachment fittings 16 and 17 for connecting the inner end of the blade 10 to a central rotating structure. Nose spar 12 is a substantially symmetrical, channel-shaped structural element characterized by a massive web or nose portion 18 and a pair of relatively wide flange portions 19 extending rearwardly equal distances from the nose portion such as to define a channel 20 having a rounded bottom 21. As seen in Fig. 2, the structural element comprising nose spar 12 is homogeneous, that is, it is made of one piece of material and is proportioned such that a large part of the material comprising the element is concentrated in the web or nose portion 18 to provide this portion with a massiveness sufficient to effect the desired cordwise weight distribution relative to the cordwise gravity center or blade pitch axis 65 (Fig. 1), and such that each flange portion 19 gradually decreases from a maximum thickness at its junction with the nose portion to a minimum thickness at its distal edge; moreover, the external surfaces of the nose and flange portions merge so as to provide nose spar 12 with an external contour corresponding to the contour of the forward portion of the desired airfoil section. Thus, the rigidity of nose spar 12, with respect to forces applied thereto in directions transversely of flange portions 19, is like all deep channel-shaped structural members, that is, it decreases from a maximum in the region of the web or nose portion to a minimum at the distal edges of the flange portions. Furthermore, in view of the necessity for maintaining the contour of the contour-sensitive forward portion of the airfoil section, the transverse rigidity of the nose spar must be sufficient to meet this requirement; hence the flange portions of nose spar 12 are proportioned so as to provide adequate reinforcement for the contour sensitive forward portion of the blade.

The trailing edge strip 13 is of triangular form corresponding to the trailing edge contour of the airfoil section and may be made from pregwood or lightweight metal such as an aluminum alloy; whereas, the nose spar 12 is extruded aluminum or other lightweight material or alloy.

As illustrated in Figs. 1, 2, and 8, airfoil skin 11 comprises a rectangular sheet of lightweight material, such as an aluminum alloy, bent along the medial portion 22 thereof so that the inner surface of the medial portion conforms to the external surface of nose spar 12, and so that opposing sides 23 of the bent sheet converge to a junction of the sheet edges 24 with trailing edge strip 13 to form a trailing edge 25 and otherwise complete the airfoil contour of blade 10. As previously indicated, nose spar 12 and trailing edge strip 13 are cementitiously bonded in their respective positions to inner surfaces of skin 11 by a method hereinafter described, so that the blade airfoil section is accurately and permanently established.

Attachment end 26 of the blade 10 has a filler piece 14, Fig. 5, applied thereto. This filler piece 14 has a rounded wall 28 which fits against the end of the nose spar 12. A block 29 projects from the wall 28 into the end of nose spar channel 20 as shown in Fig. 3 to receive a long bolt 30 seen in Figs. 1 and 4, which cooperates in holding a pair of attachment fittings 16 in place. The filler piece 14 has an intermediate section 31 which closes the opening between the ends of the skin sides 23, and a tapered block portion 32 which is positioned between the end portions of the skin edges 24 adjacent the end of the trailing edge strip 13. The filler piece 14 forms a part of the means for connecting blade end 26 to the rotatable supporting member with which the blade 10 is used.

Attachment fittings 16 comprise plates 36 having extended nose portions 37 which are arranged to project from the attachment end of blade 10, with openings 38 therein for receiving bolt means for connecting the blade to the supporting rotatable structure. The plates 36 are disposed on the upper and lower surfaces of skin 11 in overlying relation to the flanges 19 of the nose spar 12, and small bolts 39 are employed to secure the plates 36 directly to the flanges 10 of nose spar 12 and the contiguous portions of the skin 11. As shown in Figs. 1 and 3, a pair of wedge-shaped fittings is riveted to blade 10 along trailing edge 25 adjacent blade end 26. Projections 33 of fittings 17 extend over block 32 of filler piece 14 to which they are securely connected by a rivet 34 extending through projections 33, block 32, and interjacent portions of skin 11. An opening 35 through fittings 17, block 32 of filler piece 14, and corners of skin 11, is adapted to receive a suitable pin or bolt such that fittings 17 assembled as described with blade 10, cooperate with attachment fittings 16 for connecting blade 10 to the rotatable supporting structure of a helicopter.

A second filler piece 15, fitted and firmly connected to the other end 26a of blade 10 (see Fig. 1) has a form identical to that of filler piece 14 shown in Fig. 5, except that block 29a of filler piece 15 is dimensioned to project a greater distance into the space between flanges 19 of nose spar 12 in comparison with block 29 of filler piece 14. Block 29a is constructed with an opening or cavity 63 containing a body 64 of heavy material such as lead, positioned on the pitch axis 65 of blade 10, which axis corresponds to the cordwise gravity center of the blade, and is in the region or range of the aerodynamic center when the blade is in use. It is to be noted that the distal edges of nose spar flanges 19 extend beyond axis 65 in the direction of blade trailing edge 25 an appreciable distance relative to the cordwise dimension of nose spar 12, to provide cordwise blade stiffness in keeping with the requirements essential to maintain the contour of the contour-sensitive forward portion of the blade.

For use in the method of assembling and cementitiously bonding skin 11, nose spar 12, and trailing edge strip 13 into a composite structure comprising blade 10, I provide a jig 40 having upper and lower companion parts 41 and 42, the cooperating faces of which are formed so as to provide a cavity 43 corresponding to the desired airfoil contour of blade 10 as shown in Fig. 9, so that when the component blade parts are placed in the cavity 43 the skin 11 will be restrained from outward movement by the adjacent cavity walls 44 and 45. The jig parts 41 and 42 are made of heat conductive metal and are provided with thermostatically controlled heating elements 46 for bringing the walls 44 and 45 to the temperatures required for the cement employed in the bonding operation. In preparation for assembling of the parts, the extrusions comprising the nose spar 12 and the trailing edge strip 13 are thoroughly cleaned and dried. To the outer surface 18a of nose spar 12, Fig. 6, and to the side faces 13a and 13b of the trailing edge strip 13, Fig. 7, a coat of thermosetting bonding agent, such as plycotite adhesive, is applied and allowed to dry.

The rectangular sheet of thin metal comprising the skin 11 is bent along its medial portion 22, Fig. 8, by use of fixture blocks which shape the leading edge so that it will conform to the desired airfoil contour in preparation for bonding to the external surface 18a of the nose spar 12, see Fig. 6. As indicated at 47 and 48 in Fig. 8, layers of the thermosetting bonding agent are applied to the portions of the inner surface of the skin 11 which are to be bonded to the nose spar and trailing edge strip. The adhesive-coated nose spar 12 and trailing edge strip 13 are placed within the preformed skin 11 and this assembly of parts is then placed in the cavity 43 of the jig 40 as shown in Fig. 9. Within the hollow or internal space 49 of skin 11 (in jig 40) expanding means are placed to force spar 12 and trailing edge strip 13 positively and tightly into the respective positions which they are to occupy within the skin of the finished blade. While forces of the expanding means are being applied to the nose spar and trailing edge strip, forces are also applied to spar flange portions 19 such that the adhesive-coated surfaces of the flanges are forced into firm contact with the contiguous adhesive-coated surfaces of skin 11. Now, while the nose spar 12 and trailing edge strip are pressed tightly against the respective internal surfaces of the skin, heat from walls 44 and 45 of jig 40 causes the thermosetting adhesive to effect a relationship wherein the nose spar and trailing edge strip are bonded to the airfoil skin such as to afford great resistance to separation. The expanding means employed in the space 49 of skin 11 (in the jig) includes a wood filler strip 50 which fits the channel 20 of nose spar 12 and has therein a channel 51 arranged to receive a rubber hose 52. A rubber strip 53 is disposed adjacent the vertical base of the trailing edge strip 13 and a wood spacer strip 54 is disposed along the rubber strip 53. A laterally expansible structure 55 is then placed in the space 49 in cooperative relationship with hose 52 and spacer strip 54. This expansible structure 55 comprises a channel 56 adapted to engage the strip 54, a larger channel 57 arranged along the filler strip 50 and separated therefrom by a spacer strip 58, and toggle means 59 comprising sets of links 60 and 61 for spreading the channels 56 and 57, and rods 62 for swinging the links 60 and 61. The spreading of channels 56 and 57 by toggle means 59, produces positioning forces whereby nose spar 12 and trailing edge strip 13 are forced in the direction of their respective final positions in skin 11. To provide the forces essential to a completely bonded condition of the nose spar and trailing edge strip in their exact positions in skin 11, rubber hose 52 is expanded by fluid pressure applied thereto from a suitable source. As a result of this expansion, hose 52 applies additional forces such as to not only effect final positioning of nose spar 12 and trailing edge strip 13, but to also spread the side walls of channel 51 in filler strip 50, so as to force the adhesive-coated nose spar flange portions 19 into firm contact with the adjacent adhesive-coated surfaces of skin 11. Thus, under the influence of heat from jig walls 44 and 45, and forces applied by the expanding means in the hollow or internal space 49 of skin 11, the nose spar and trailing edge strip are cementitiously bonded to the skin in their proper positions.

Upon completion of the thermosetting action of the adhesive employed, the assembled elements are freed of the expanding means and removed from jig 40 as a unitary structure ready to receive filler pieces 14, 15 and fittings 16, 17 such as to constitute the completed rotor blade 10 seen in Fig. 1.

In Fig. 11, I show an alternative manner of constructing the trailing edge of the rotor blade 10. Instead of employing a solid triangular trailing edge strip, a strip of metal 67 is bent along its center line so as to form a V-shaped channel which is bonded in place with the diverging flanges 68 thereof contiguous to the converging edge portions 24 of sides 23 of the bent sheet of material comprising the airfoil skin. In this form of trailing edge construction, edge portions 24 are provided with margins 69 which are brought together and secured by bonding in face to face relation. As shown in Fig. 12, additional strength in the bonding of the skin 11 to the flanges 19 of nose spar 12 can be provided by securing strips 70 of lightweight metal in positions to overlap the edges of the flanges 19 and the surfaces of the skin 11 lying therealong.

In Fig. 13 is shown a blade section similar to that shown in Fig. 2, which permits the use of thinner material in skin 11 by adding a lightweight reinforcing structure 71 of balsa wood or a light metal honeycomb, which is interposed between the sides 23 of the skin 11 and bonded to the inner surfaces of the skin 11 between nose spar 12 and trailing edge strip 13.

In Fig. 14 I show how my invention may be carried out with non-metal sheet material for the skin by use of the equipment shown in Figs. 9 and 10 and by employment of the method described with relation thereto. A skin 11a of fibre glass sheet is placed around a nose spar 12 and a trailing edge strip 13 so as to constitute a blade section having an airfoil contour. A second fibre sheet 11b is disposed within the blade section so that the bend 73 thereof lies in the channel 20 defined by the flanges 19 of nose spar 12, and so that side portions 74 of the sheet 11b lie along the sides 23 of the sheet 11a. This entire assembly is heated in jig 40 to solidify the bonding agent interjacent the fibre glass layers and thereby produce a structurally and aerodynamically capable blade element having the desired airfoil section.

From the foregoing description, it should now be apparent to persons skilled in the art that my invention provides a rotor blade having all the desirable characteristics essential to efficient and durable operation in a helicopter rotor and, at the same time, is well suited for mass production by the simple and inexpensive methods of manufacture above-described.

I claim:

1. A hollow thrust-producing rotor blade having cordwise and spanwise axes, said rotor blade comprising: a hollow airfoil skin generally symmetrical about the cordwise axis, having forward and rearward portions respectively disposed on opposite sides of the spanwise axis and embracing the leading and trailing edges of the blade; and homogeneous means effecting a uniformly stiffened condition of the blade against spanwise bending and a nonuniformly stiffened condition of the blade against cordwise bending, said nonuniform condition ranging from a maximum stiffness in the region of the leading edge through decrescent values to a minimum stiffness in the region of the spanwise axis, said homogeneous means comprising an extruded element having a channel-shaped cross section characterized by a massive web portion and elongated flange portions which gradually decrease from a maximum thickness at their junctions with the web portion to a minimum thickness at their distal edges; said channel-shaped extruded element being disposed within the hollow airfoil skin such that the massive web portion is in the region of the blade leading edge, and the distal edges of the flange portions are in the region of the spanwise axis.

2. In an aerodynamic-thrust-producing rotor blade having a hollow airfoil skin externally contoured to provide the blade with optimum thrust-producing ability, and a spanwise pitch-changing axis coincident with the cordwise gravity center of the blade, said airfoil skin having forward and rearward portions disposed on opposite sides of the spanwise axis respectively comprising leading and trailing edges of the blade, said forward hollow skin portion being characterized by sensitivity to deviations from its external contour to the extent that the thrust-producing ability of the blade is diminishingly affected by such deviations, and said contour-deviation sensitivity being graduated from a maximum in the region of the leading edge through a range of decrescent values to a minimum in the region of the spanwise axis, the improvement comprising: means fixedly associated with the forward hollow skin portion and the longitudinal axis of the blade throughout the length of said skin, so constructed and arranged as to counteract the sensitivity to contour deviations and effect the location of the cordwise gravity center along the spanwise axis of the blade, said means comprising a homogeneous structural element having a relatively deep channel-shaped cross section characterized by a massive web portion and elongated flanges which flanges decrease in thickness from maximum values at their junctions with the web portion to minimum values at their distal edges, said massive web portion and said flanges cooperating as means counteracting the deviation sensitivity of the forward hollow skin portion, and said massive web portion comprising weight effecting coincidence of the blade cordwise gravity center with the spanwise axis of the blade.

3. In an aerodynamic-thrust-producing rotor blade having a hollow airfoil skin externally contoured to provide the blade with optimum thrust-producing ability, and a spanwise pitch-changing axis coincident with cordwise gravity center of the blade, said airfoil skin having forward and rearward portions disposed on opposite sides of the spanwise axis respectively comprising leading and trailing edges of the blade, said forward hollow skin portion being characterized by sensitivity to deviations from its external contour to the extent that the thrust-producing ability of the blade is diminishingly affected by such deviations, and said contour-deviation sensitivity being graduated from a maximum in the region of the leading edge through a range of decrescent values to a minimum in the region of the spanwise axis, the improvement comprising: a nose spar disposed within the forward hollow skin portion fixed to the inner-surface of the skin throughout the length thereof, so constructed and arranged as to provide graduated rigidity to said forward hollow skin portion ranging from maximum rigidity in the region of maximum sensitivity through a series of decrescent values to minimum rigidity in the region of minimum sensitivity for counteracting the sensitivity to contour deviations of the forward skin portion and to provide weight for effecting the position of the cordwise gravity center along the spanwise axis of the blade, said nose spar comprising a homogeneous element having a relatively deep channel-shaped cross section externally contoured to fit the internal contour of the forward hollow skin portion, said channel-shaped cross section being further characterized by a massive web portion adjacent the blade leading edge, and by elongated flanges extending toward the blade trailing edge, said web portion and said flange being dimensionally proportioned such as to provide the graduated rigidity for counteracting the deviation sensitivity of the forward hollow skin portion, and such that the massive web portion also supplies weight effecting coincidence between the cordwise gravity center and the spanwise axis of the blade.

4. The improvement according to claim 3 wherein the fixed relationship of the nose spar to the inner surface of the forward hollow skin portion is effected by a bonding agent interjacent said inner surface and the external contoured surface of the homogeneous element comprising said nose spar.

References Cited in the file of this patent

UNITED STATES PATENTS 2,111,975   Larsen _____ Mar. 22, 1938

(Other references on following page)

UNITED STATES PATENTS

| | | |
|---|---|---|
| 2,293,801 | Caldwell | Aug. 25, 1942 |
| 2,430,854 | Berliner | Nov. 18, 1947 |
| 2,568,230 | Gluhareff | Sept. 18, 1951 |
| 2,574,651 | Meyers | Nov. 13, 1951 |
| 2,593,714 | Robinson | Apr. 22, 1952 |
| 2,630,868 | Ellenberger | Mar. 10, 1953 |
| 2,644,537 | Meyers | July 7, 1953 |
| 2,674,327 | Pullin et al. | Apr. 6, 1954 |
| 2,693,922 | Ellison et al. | Nov. 9, 1954 |
| 2,754,915 | Echeverria | July 17, 1956 |

FOREIGN PATENTS

| | | |
|---|---|---|
| 361,799 | Great Britain | Nov. 26, 1931 |
| 623,322 | Great Britain | May 16, 1949 |
| 644,900 | Great Britain | Oct. 18, 1950 |
| 720,091 | Germany | Apr. 24, 1942 |
| 724,758 | Great Britain | Feb. 23, 1955 |
| 1,113,002 | France | Nov. 23, 1955 |
| 1,113,837 | France | Dec. 12, 1955 |